US012621015B2

(12) United States Patent
Dorer et al.

(10) Patent No.: US 12,621,015 B2
(45) Date of Patent: May 5, 2026

(54) RECEIVER PATH FOR A MEASUREMENT DEVICE AND MEASUREMENT DEVICE COMPRISING SUCH A RECEIVER PATH

(71) Applicant: Rohde & Schwarz GmbH & Co. KG, Munich (DE)

(72) Inventors: Alexander Dorer, Augsburg (DE); Matthias Lutz, Ottobrunn (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 606 days.

(21) Appl. No.: 17/955,154

(22) Filed: Sep. 28, 2022

(65) Prior Publication Data

US 2024/0106477 A1       Mar. 28, 2024

(51) Int. Cl.
*H04B 1/18*          (2006.01)
*H04B 1/16*          (2006.01)

(52) U.S. Cl.
CPC ............. *H04B 1/18* (2013.01); *H04B 1/1607* (2013.01)

(58) Field of Classification Search
CPC ... H04B 1/06; H04B 1/08; H04B 1/10; H04B 1/109; H04B 1/12; H04B 1/123; H04B 1/16; H04B 1/1607; H04B 1/18
See application file for complete search history.

(56) References Cited

U.S. PATENT DOCUMENTS

| | | | | |
|---|---|---|---|---|
| 5,408,698 A * | 4/1995 | Serizawa | ............. | H03G 3/3052 455/245.1 |
| 6,282,252 B1 * | 8/2001 | Fushimi | ............... | H03G 1/0058 455/307 |
| 7,599,674 B2 * | 10/2009 | Layne | .................... | H04B 1/109 455/249.1 |
| 7,706,762 B2 * | 4/2010 | Kirisawa | ................ | H04B 1/109 455/67.11 |
| 8,200,159 B2 * | 6/2012 | Dussauby | ............ | H04B 1/0092 455/180.1 |
| 10,439,563 B2 * | 10/2019 | Takagi | .................... | H03F 3/245 |
| 2009/0046607 A1 | 2/2009 | Lee et al. | | |

FOREIGN PATENT DOCUMENTS

IN       201841035757 A       9/2018

OTHER PUBLICATIONS

Renesas, "75 ohm Voltage Variable RF Attenuator", retrieved on Sep. 28, 2022 from https://www.renesas.com/us/en/products/rf-products/rf-attenuators/f2270-75-ohm-voltage-variable-rf-attenuator#document, 2 pages.

* cited by examiner

*Primary Examiner* — Quochien B Vuong
(74) *Attorney, Agent, or Firm* — DITTHAVONG, STEINER & MLOTKOWSKI

(57)          ABSTRACT
A receiver path for a measurement device is provided. Said receiver path comprises a radio frequency input path for inputting a radio frequency input signal, a mixer for generating an intermediate frequency signal by mixing the radio frequency input signal with a local oscillator signal, and an intermediate frequency signal carrying path for carrying the intermediate frequency signal. In this context, the intermediate frequency signal carrying path comprises a voltage variable attenuator.

19 Claims, 3 Drawing Sheets

RECEIVER PATH FOR A MEASUREMENT DEVICE AND MEASUREMENT DEVICE COMPRISING SUCH A RECEIVER PATH

TECHNICAL FIELD

The invention relates to a receiver path, especially a receiver path with compensation of gain over temperature, for a measurement device, and a measurement device comprising such a receiver path.

BACKGROUND ART

Generally, in times of an increasing number of applications providing radio frequency capabilities, there is a growing need of a receiver path for a measurement device and a measurement device comprising such a receiver path for performing radio frequency measurements with respect to a device under test comprising such an application in order to verify correct functioning of said applications in a highly accurate and efficient manner.

In this context of testing, common measurement devices, especially common measurement devices with common receiver paths, for performing radio frequency measurements have always the problem of inaccuracies and inefficiencies in the case of temperature changes during measuring due to a temperature dependence of at least some parts of the corresponding receiver path.

For instance, IN 201841035757 A discloses an up-down converter comprising radio frequency blocks, wherein at least one of the radio frequency blocks comprises at least one voltage variable attenuator to prevent the receiver from getting saturated. Disadvantageously, such a configuration does not allow for fully compensating temperature changes in a particularly efficient manner.

Furthermore, an example of a voltage variable attenuator is shown by the "F2270 Datasheet" of Renesas Electronics America Inc.

In addition to this, EP 3 211 792 A1 provides apparatus and methods for high linearity voltage variable attenuators.

Moreover, US 2009/0046607 A1 discloses an apparatus and a method for controlling automatic gain in a wireless communication system using a Time Division Duplex scheme.

Accordingly, there is a need to provide a receiver path for a measurement device and a measurement device comprising such a receiver path, whereby both a high accuracy and a high efficiency are ensured.

SUMMARY OF THE INVENTION

According to a first aspect of the invention, a receiver path for a measurement device is provided. Said receiver path comprises a radio frequency input path for inputting a radio frequency input signal, a mixer for generating an intermediate frequency signal by mixing the radio frequency input signal with a local oscillator signal, and an intermediate frequency signal carrying path for carrying the intermediate frequency signal. In this context, the intermediate frequency signal carrying path comprises a voltage variable attenuator. Advantageously, this allows for a consistently high level accuracy with temperature fluctuations in a particularly efficient manner.

Further advantageously, for instance, there is no need to readjust the corresponding gain in case of temperature fluctuations, which also leads to no need to restart the measurement, thereby ensuring a particularly high efficiency.

According to a first preferred implementation form of the first aspect of the invention, the radio frequency input path comprises at least one preselector, preferably at least one filter, and/or at least one attenuator, and/or at least one amplifier. Advantageously, for example, complexity can be reduced, which leads to an increased efficiency.

According to a second preferred implementation form of the first aspect of the invention, the at least one preselector, preferably the at least one filter, is switchable, and/or the at least one attenuator is switchable, and/or the at least one amplifier is switchable. Advantageously, for instance, a high flexibility can be ensured, thereby allowing for a high efficiency.

According to a further preferred implementation form of the first aspect of the invention, the intermediate frequency signal carrying path further comprises at least one amplifier, and/or at least one attenuator. Advantageously, for example, simplicity can be increased, which leads to an increased efficiency.

According to a further preferred implementation form of the first aspect of the invention, the intermediate frequency signal carrying path is adapted to feed the intermediate frequency signal into an analog-to-digital converter or into an analog-digital-converter through a filter, preferably an anti-aliasing filter. Advantageously, for instance, best possible Error Vector Magnitude (EVM) performance can be achieved especially due to an optimum modulation of the analog-to-digital converter, thereby ensuring a particularly high accuracy and efficiency.

Further advantageously, the signal-to-noise ratio can be increased, which also leads to reduced inaccuracies and inefficiencies.

According to a further preferred implementation form of the first aspect of the invention, the intermediate frequency signal carrying path comprises the analog-to-digital converter and/or the filter, preferably the anti-aliasing filter. Advantageously, for example, the receiver path can be built as a subassembly being flexibly integrated into different measurement devices, which leads to an increased efficiency.

According to a further preferred implementation form of the first aspect of the invention, the intermediate frequency signal carrying path is adapted to feed the intermediate frequency signal into the analog-to-digital converter through the voltage variable attenuator or into the filter, preferably the anti-aliasing filter, through the voltage variable attenuator. Advantageously, for instance, complexity can further be reduced, thereby also reducing inefficiencies.

According to a further preferred implementation form of the first aspect of the invention, the voltage variable attenuator is adapted to change its attenuation to compensate ambient temperature changes, preferably to compensate temperature changes with respect to the corresponding printed circuit boards. Advantageously, for example, there is no digital scaler required for temperature compensation, thereby saving costs and increasing efficiency.

Further advantageously, knowledge of the corresponding temperature response remains on the respective subassembly.

According to a further preferred implementation form of the first aspect of the invention, the voltage variable attenuator is adapted to change its attenuation in a continuous manner. Advantageously, for instance, a particularly high accuracy can be ensured.

According to a further preferred implementation form of the first aspect of the invention, the voltage variable attenuator is adapted to increase its attenuation if the ambient temperature, preferably the temperature with respect to the corresponding print circuit boards, decreases. Advantageously, for example, the voltage variable attenuator can be designed in a simple manner, thereby reducing costs, inaccuracies, and inefficiencies.

According to a further preferred implementation form of the first aspect of the invention, the voltage variable attenuator is adapted to decrease its attenuation if the ambient temperature, preferably the temperature with respect to the corresponding print circuit boards, increases.

According to a further preferred implementation form of the first aspect of the invention, the measurement device is provided with at least one ambient sensor, preferably at least one ambient temperature sensor. Advantageously, for instance, the measurement device can measure environmental parameters such as temperature, which can be used for hinting the user the corresponding measure of temperature compensation to be expected.

According to a further preferred implementation form of the first aspect of the invention, the measurement device is adapted to estimate ambient temperature changes on the basis of temperature changes with respect to the corresponding printed circuit boards. Advantageously, for example, the corresponding room temperature can be estimated in an efficient manner.

According to a further preferred implementation form of the first aspect of the invention, the voltage variable attenuator comprises or is a positive intrinsic negative diode. Advantageously, for instance, complexity can further be reduced, thereby increasing efficiency.

Further advantageously, if the positive intrinsic negative diode or the voltage variable attenuator, respectively, is used in the intermediate frequency signal carrying path, the corresponding level ratios are substantially constant, since the corresponding mixer level is kept constant. This especially allows the positive intrinsic negative diode or the voltage variable attenuator, respectively, to be designed to an almost fixed input level and optimized in terms of intermodulation distortion or non-linear distortion, respectively, and noise figure.

An additional advantage may be the lower frequency in the intermediate frequency signal carrying path, which makes the design of the positive intrinsic negative diode or the voltage variable attenuator, respectively, easier in terms of matching.

According to a further preferred implementation form of the first aspect of the invention, the positive intrinsic negative diode comprises or is a positive intrinsic negative diode with bias current or a positive intrinsic negative diode with bias voltage. Advantageously, for example, if this bias current is coupled to the corresponding operating temperature, the gain of the intermediate frequency signal carrying path can be continuously adjusted to fully drive the analog-to-digital converter over a certain temperature range.

According to a further preferred implementation form of the first aspect of the invention, the voltage variable attenuator is designed on the basis of temperature characteristics of at least one amplifier of the corresponding receiver. Advantageously, for instance, for the coupling of the positive intrinsic negative diode to the corresponding operating temperature, the temperature behavior of the amplifier in the receiver can be characterized in a simple and efficient manner.

According to a further preferred implementation form of the first aspect of the invention, the temperature characteristics are obtained on the basis of measurements in a climate cabinet, wherein the voltage variable attenuator is preferably held constant. Advantageously, for example, this allows for a particularly simple and efficient characterization of the corresponding temperature behavior.

According to a second aspect of the invention, a measurement device is provided. Said measurement device comprises a receiver path according to the first aspect of invention or any of its preferred implementation forms, respectively. Advantageously, for instance, full use is made of the dynamic range of the corresponding analog-to-digital converter while maintaining the same level accuracy, thereby ensuring a particularly high accuracy and efficiency.

Further advantageously, an increase of the signal-to-noise ratio can be achieved, which leads to reduced inaccuracies.

As a further advantage, a better demodulation quality or a better Error Vector Magnitude (EVM) performance, respectively, can be achieved, thereby increasing accuracy.

As an additional advantage, no digital scaler is required for temperature compensation. In this context, it is noted that the knowledge of the corresponding temperature response remains on the respective subassembly. In other words, the corresponding gain change or attenuation change, respectively, is thus compensated directly in the analog hardware and digital recalculation is not necessary.

According to a first preferred implementation form of the second aspect of the invention, the measurement device further comprises at least one ambient sensor, preferably at least one ambient temperature sensor. Advantageously, for instance, the measurement device can measure environmental parameters such as temperature, which can be used for hinting the user the corresponding measure of temperature compensation to be expected.

According to a second preferred implementation form of the second aspect of the invention, the measurement device is adapted to estimate ambient temperature changes on the basis of temperature changes with respect to the corresponding printed circuit boards. Advantageously, for example, the corresponding room temperature can be estimated in an efficient manner.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
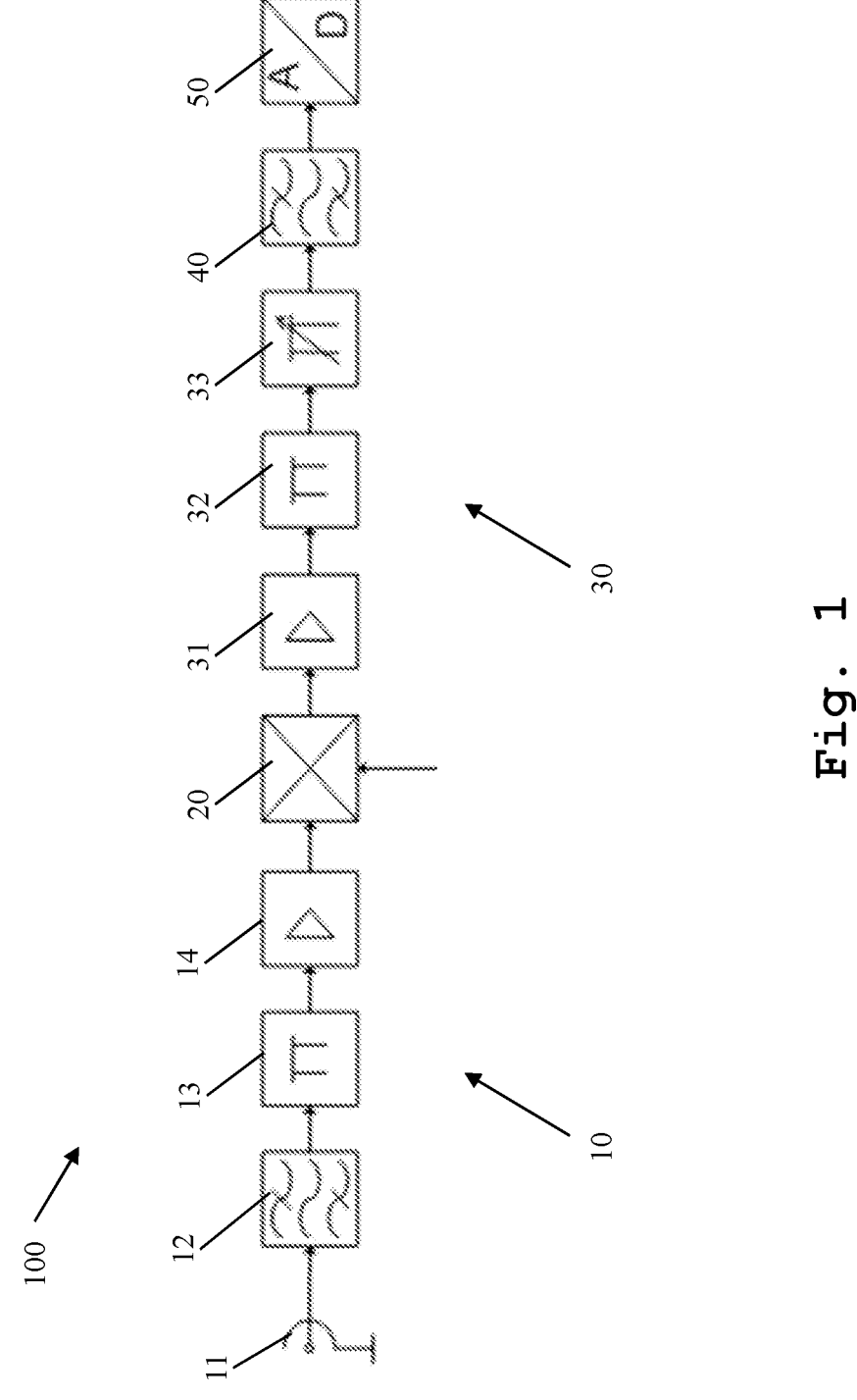
FIG. 1 shows an exemplary embodiment of the first aspect of the invention.

Firstly, FIG. 1 illustrates an exemplary embodiment of the inventive receiver path 100 for a measurement device.

In accordance with FIG. 1, said receiver path 100 comprises a radio frequency input path 10 for inputting a radio frequency input signal, a mixer 20 for generating an intermediate frequency signal by mixing the radio frequency input signal with a local oscillator signal, and an intermediate frequency signal carrying path 30 for carrying the intermediate frequency signal. In this context, the intermediate frequency signal carrying path 30 comprises a voltage variable attenuator 33.

As it can further be seen from FIG. 1, the radio frequency input path 10 comprises a radio frequency input 11, preferably in the form of a port or terminal, a preselector 12, preferably in the form of a filter, more preferably in the form of a band-pass filter, an attenuator 13, and an amplifier 14.

In this context, the radio frequency input 11 is connected to a first terminal, preferably an input, of the preselector 12, whereas a second terminal, preferably an output, of the preselector 12 is connected to a first terminal, preferably an input, of the attenuator 13. In addition to this, a second terminal, preferably an output, of the attenuator 13 is connected to a first terminal, preferably an input, of the amplifier 14, whereas a second terminal, preferably an output, of the amplifier 14 is connected to a first terminal, preferably an input, of the mixer 20.

Typically, the above-mentioned local oscillator signal is present at a second terminal, preferably an input, of the mixer 20, whereas a third terminal, preferably an output, of the mixer 20 is adapted to feed the above-mentioned intermediate frequency signal into the intermediate frequency signal carrying path 30.

With respect to the preselector 12, preferably the filter or band-pass filter, respectively, it is noted that it might be particularly advantageous if the preselector 12, preferably the filter or band-pass filter, respectively, is switchable.

Additionally or alternatively, the attenuator 13 may preferably be switchable. In further addition to this or as a further alternative, the amplifier 14 may preferably be switchable.

As it can further be seen from FIG. 1, the intermediate frequency signal carrying path 30 further comprises an amplifier 31, and an attenuator 32.

In this context, the above-mentioned third terminal, preferably the output, of the mixer 20 is connected to a first terminal, preferably an input, of the amplifier 31.

Furthermore, a second terminal, preferably an output, of said amplifier 31 is connected to a first terminal, preferably an input, of the above-mentioned attenuator 32, whereas a second terminal, preferably an output, of said attenuator 32 is connected to a first terminal, preferably an input, of the above-mentioned voltage variable attenuator 33.

Moreover, the intermediate frequency signal carrying path 30 is adapted to feed the intermediate frequency signal into an analog-digital-converter 50 through a filter 40, preferably an anti-aliasing filter or a band-pass filter, respectively.

Accordingly, in this exemplary case, a second terminal, preferably an output, of the above-mentioned voltage variable attenuator 33 is connected to a first terminal, preferably an input, of the above-mentioned filter 40, whereas a second terminal, preferably an output, of said filter 40 is connected to a first terminal, preferably an input, of the above-mentioned analog-to-digital converter 50.

According to FIG. 1, the intermediate frequency signal carrying path 30 comprises the above-mentioned analog-to-digital converter 50 and the filter 40, preferably the anti-aliasing filter or band-pass filter, respectively.

With respect to the voltage variable attenuator 33, it is noted that it might be particularly advantageous if the voltage variable attenuator 33 changes its attenuation to compensate ambient temperature changes, preferably to compensate temperature changes with respect to the corresponding printed circuit boards.

Further advantageously, the voltage variable attenuator 33 may preferably change its attenuation in a continuous manner.

Moreover, it might be particularly advantageous if the voltage variable attenuator 33 increases its attenuation if the ambient temperature, preferably the temperature with respect to the corresponding print circuit boards, decreases.

Vice versa, the voltage variable attenuator 33 may preferably decrease its attenuation if the ambient temperature, preferably the temperature with respect to the corresponding print circuit boards, increases.

Especially in this context, it might be particularly advantageous if the corresponding measurement device is provided with at least one ambient sensor, preferably at least one ambient temperature sensor.

Further advantageously, the corresponding measurement device may preferably estimate ambient temperature changes on the basis of temperature changes with respect to the corresponding printed circuit boards.

Again, with respect to the voltage variable attenuator 33, it is noted that it might be particularly advantageous if the voltage variable attenuator 33 comprises or is a positive intrinsic negative diode (pin diode).

Further advantageously, said positive intrinsic negative diode may preferably comprise or be a positive intrinsic negative diode with bias current or a positive intrinsic negative diode with bias voltage.

It is noted that the voltage variable attenuator 33, especially the pin diode, may preferably be designed on the basis of temperature characteristics of at least one amplifier of the corresponding receiver.

In this context, it might be particularly advantageous if the temperature characteristics are obtained on the basis of measurements in a climate cabinet, wherein the voltage variable attenuator 33, especially the pin diode, is preferably held constant.

Figure 2:
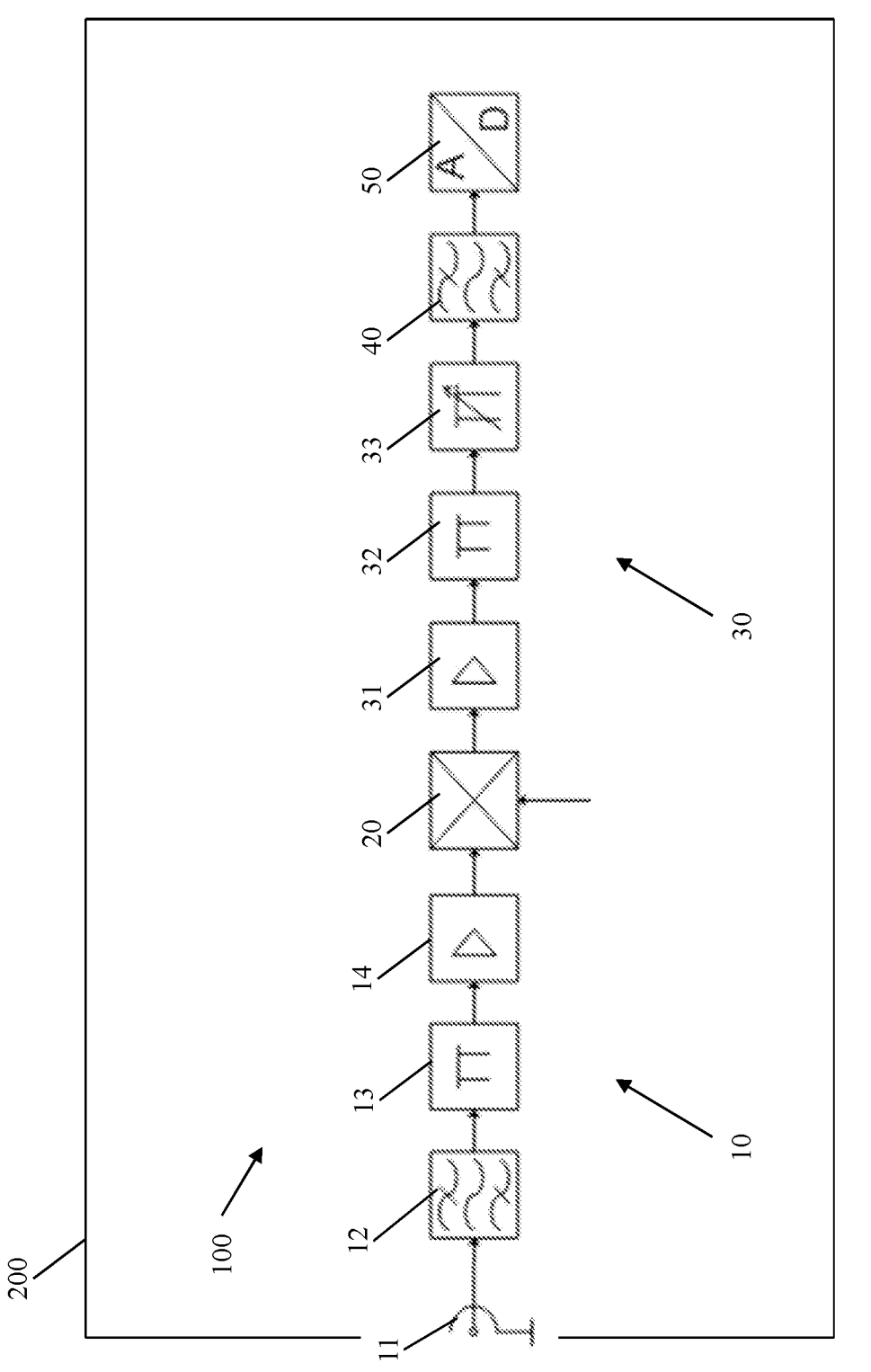
FIG. 2 shows an exemplary embodiment of the second aspect of the invention.

Now, with respect to FIG. 2, a measurement device 200 according to the second aspect of the invention is illustrated. Said measurement device 200 comprises the receiver path 100 as described above.

Figure 3:
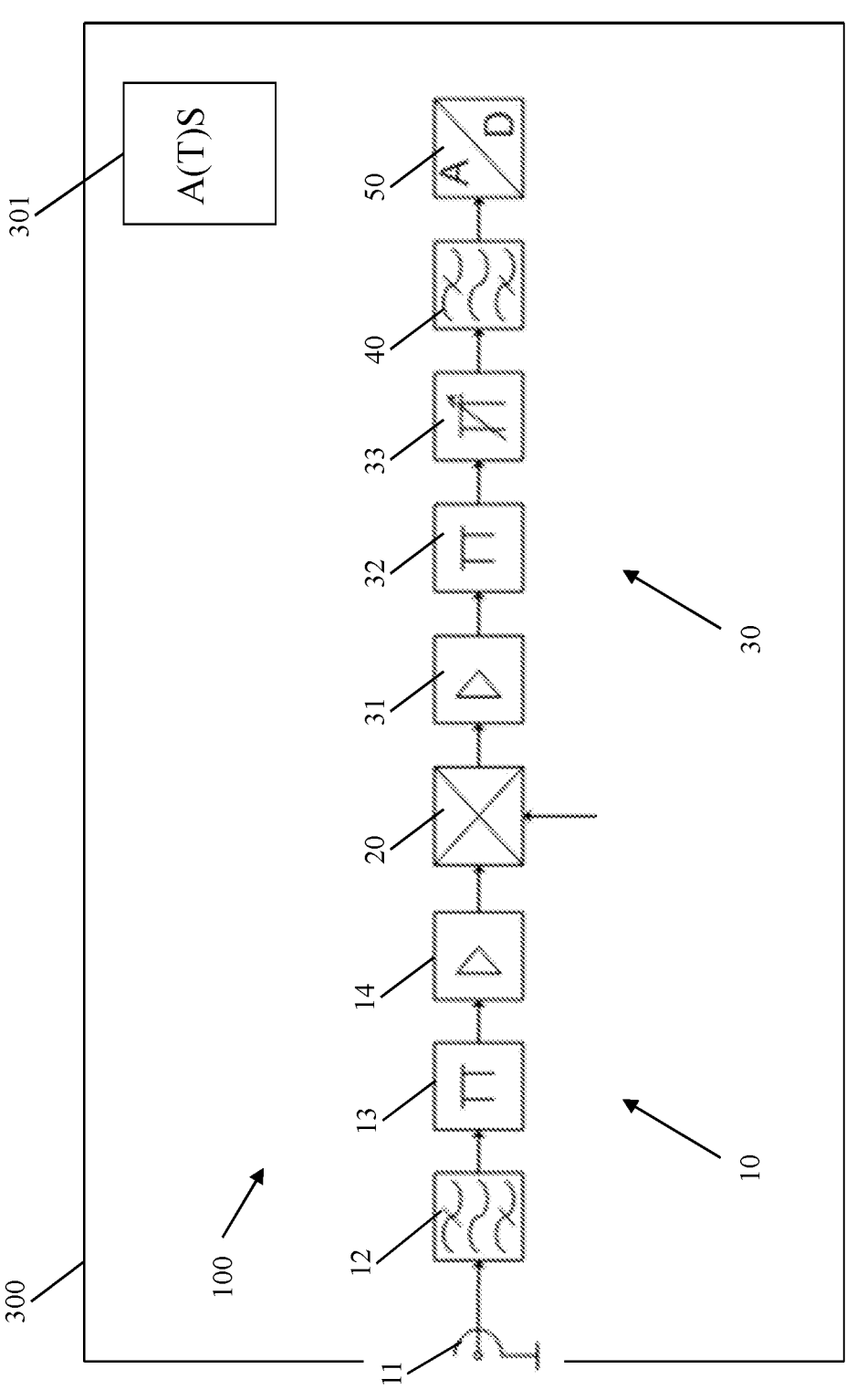
FIG. 3 shows a further exemplary embodiment of the second aspect of the invention.

In addition to this, FIG. 3 depicts another exemplary embodiment 300 of the inventive measurement device being based on the embodiment 200 according to FIG. 2, wherein the measurement device 300 further comprises an ambient sensor 301, preferably an ambient temperature sensor.

With respect to both the embodiment 200 of FIG. 2 and the embodiment 300 of FIG. 3, it is noted that it might be particularly advantageous if the measurement device 200 or the measurement device 300, respectively, estimates ambient temperature changes on the basis of temperature changes with respect to the corresponding printed circuit boards.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A receiver path for a measurement device, the receiver path comprising:

a radio frequency input path for inputting a radio frequency input signal, a mixer for generating an intermediate frequency signal by mixing the radio frequency input signal with a local oscillator signal, and an intermediate frequency signal carrying path for carrying the intermediate frequency signal, wherein the intermediate frequency signal carrying path comprises a voltage variable attenuator, wherein the voltage variable attenuator is adapted to change its attenuation to compensate ambient temperature changes with respect to printed circuit boards associated with the measurement device.

2. The receiver path according to claim 1, wherein the radio frequency input path comprises:

at least one preselector, preferably at least one filter, and/or at least one attenuator, and/or at least one amplifier.

3. The receiver path according to claim 2, wherein the at least one preselector, preferably the at least one filter, is switchable, and/or wherein the at least one attenuator is switchable, and/or wherein the at least one amplifier is switchable.

4. The receiver path according to claim 1, wherein the intermediate frequency signal carrying path further comprises:

at least one amplifier, and/or at least one attenuator.

5. The receiver path according to claim 1, wherein the intermediate frequency signal carrying path is adapted to feed the intermediate frequency signal into an analog-to-digital converter or into an analog-digital-converter through a filter, preferably an anti-aliasing filter.

6. The receiver path according to claim 5, wherein the intermediate frequency signal carrying path comprises the analog-to-digital converter and/or the filter, preferably the anti-aliasing filter.

7. The receiver path according to claim 5, wherein the intermediate frequency signal carrying path is adapted to feed the intermediate frequency signal into the analog-to-digital converter through the voltage variable attenuator or into the filter, preferably the anti-aliasing filter, through the voltage variable attenuator.

8. The receiver path according to claim 1, wherein the voltage variable attenuator is adapted to change its attenuation in a continuous manner.

9. The receiver path according to claim 1, wherein the voltage variable attenuator is adapted to increase its attenuation if an ambient temperature, preferably the temperature with respect to print circuit boards associated with the measurement device, decreases.

10. The receiver path according to claim 1, wherein the voltage variable attenuator is adapted to decrease its attenuation an ambient temperature, preferably the temperature with respect to print circuit boards associated with the measurement device, increases.

11. The receiver path according to claim 1, wherein the measurement device is provided with at least one ambient sensor, preferably at least one ambient temperature sensor.

12. The receiver path according to claim 1, wherein the measurement device is adapted to estimate ambient temperature changes on the basis of temperature changes with respect to the printed circuit boards associated with the measurement device.

13. The receiver path according to claim 1, wherein the voltage variable attenuator comprises or is a positive intrinsic negative diode.

14. The receiver path according to claim 13, wherein the positive intrinsic negative diode comprises or is a positive intrinsic negative diode with bias current or a positive intrinsic negative diode with bias voltage.

15. A receiver path for a measurement device, the receiver path comprising:

a radio frequency input path for inputting a radio frequency input signal, a mixer for generating an intermediate frequency signal by mixing the radio frequency input signal with a local oscillator signal, and an intermediate frequency signal carrying path for carrying the intermediate frequency signal, wherein the intermediate frequency signal carrying path comprises a voltage variable attenuator, wherein the voltage variable attenuator is adapted to change its attenuation to compensate ambient temperature changes with respect to printed circuit boards associated with the measurement device, wherein the voltage variable attenuator is designed on the basis of temperature characteristics of at least one amplifier of the receiver associated with the measurement device.

16. The receiver path according to claim 15, wherein the temperature characteristics are obtained on the basis of measurements in a climate cabinet, wherein the voltage variable attenuator is preferably held constant.

17. A measurement device comprising:

a receiver path according to any preceding claims.

18. The measurement device according to claim 17, wherein the measurement device further comprises:

at least one ambient sensor, preferably at least one ambient temperature sensor.

19. The measurement device according to claim 17, wherein the measurement device is adapted to estimate ambient temperature changes on the basis of temperature changes with respect to the printed circuit boards associated with the measurement device.

* * * * *